(12) United States Patent
Horiuchi

(10) Patent No.: US 11,613,145 B2
(45) Date of Patent: Mar. 28, 2023

(54) PNEUMATIC TIRE

(71) Applicant: The Yokohama Rubber Co., LTD., Tokyo (JP)

(72) Inventor: Kenji Horiuchi, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 399 days.

(21) Appl. No.: 16/636,009

(22) PCT Filed: Jul. 26, 2018

(86) PCT No.: PCT/JP2018/028090
§ 371 (c)(1),
(2) Date: Feb. 1, 2020

(87) PCT Pub. No.: WO2019/026759
PCT Pub. Date: Feb. 7, 2019

(65) Prior Publication Data
US 2021/0138843 A1    May 13, 2021

(30) Foreign Application Priority Data

Aug. 2, 2017  (JP) .............................. JP2017-149976

(51) Int. Cl.
*B60C 11/01*    (2006.01)
*B60C 13/02*    (2006.01)
(Continued)

(52) U.S. Cl.
CPC .............. *B60C 13/02* (2013.01); *B60C 11/01* (2013.01); *B60C 11/1369* (2013.01);
(Continued)

(58) Field of Classification Search
CPC ..... B60C 11/01; B60C 11/0306; B60C 11/11; B60C 13/02
See application file for complete search history.

(56) References Cited

U.S. PATENT DOCUMENTS

| 4,055,209 A | 10/1977 | Senger et al. |
| 5,085,259 A | 2/1992 | Goergen et al. |

(Continued)

FOREIGN PATENT DOCUMENTS

| EP | 0 428 472 | 5/1991 |
| EP | 2 163 404 | 3/2010 |

(Continued)

OTHER PUBLICATIONS

International Search Report for International Application No. PCT/JP2018/028090 dated Oct. 30, 2018, 4 pages, Japan.

*Primary Examiner* — Robert C Dye
(74) *Attorney, Agent, or Firm* — Thorpe North & Western

(57) ABSTRACT

In a pneumatic tire having a point-symmetric structure block pattern, narrow and wide outer blocks having different outer end positions in the lateral direction are alternately arranged in the circumferential direction. Among side blocks provided in a side region, large and small blocks are disposed respectively on the outer sides of the narrow and wide outer blocks in the lateral direction. The lateral and side grooves are continuous such that the groove width of the side groove connected to the wide portion of the lateral groove where the outer block converges toward the inner side in the radial direction, and the groove width of the side portion connected to the narrow portion of the lateral groove where the outer block widens toward the inner side in the radial direction, and the side block is tapered with an inner portion block width in the radial direction converges toward the wide portion.

10 Claims, 5 Drawing Sheets

(51) Int. Cl.
  *B60C 11/13* (2006.01)
  *B60C 11/03* (2006.01)
  *B60C 11/11* (2006.01)

(52) U.S. Cl.
  CPC ....... *B60C 11/11* (2013.01); *B60C 2011/0346* (2013.01); *B60C 2011/0358* (2013.01); *B60C 2011/133* (2013.01); *B60C 2011/1361* (2013.01); *B60C 2200/14* (2013.01)

(56) References Cited

U.S. PATENT DOCUMENTS

| | | | |
|---|---|---|---|
| 5,361,814 A | 11/1994 | Covert et al. | |
| 5,415,215 A | 5/1995 | Covert et al. | |
| 6,530,405 B1 * | 3/2003 | Brown | B60C 11/11 152/902 |
| 9,027,611 B2 | 5/2015 | Ashton et al. | |
| 2003/0041939 A1 * | 3/2003 | Allison | B60C 11/0316 152/209.1 |
| 2009/0107600 A1 * | 4/2009 | Missik-Gaffney | B60C 11/01 152/209.16 |
| 2010/0043934 A1 * | 2/2010 | Harvey | B60C 11/047 152/209.16 |
| 2010/0059157 A1 | 3/2010 | Ashton et al. | |
| 2016/0129733 A1 * | 5/2016 | Fujioka | B60C 11/01 152/523 |
| 2017/0182850 A1 | 6/2017 | Nakamura | |
| 2018/0154703 A1 | 6/2018 | Hayashi et al. | |

FOREIGN PATENT DOCUMENTS

| | | |
|---|---|---|
| FR | 2 330 552 | 6/1977 |
| JP | H02-128907 | 5/1990 |
| JP | H03-176210 | 7/1991 |
| JP | H04-232106 | 8/1992 |
| JP | H11-291718 | 10/1999 |
| JP | 2000-313206 | * 11/2000 |
| JP | 2010-047251 | 3/2010 |
| JP | 2015-077931 | 4/2015 |
| JP | 2016-222205 | 12/2016 |
| JP | 2017-114384 | 6/2017 |
| WO | WO 2016/194287 | 12/2016 |

* cited by examiner

PNEUMATIC TIRE

TECHNICAL FIELD

The present technology relates to a pneumatic tire suitable as a tire used for driving on unpaved roads and in particular relates to a pneumatic tire providing enhanced wear resistance on paved roads and traveling performance and cut resistance on unpaved roads in a compatible manner.

BACKGROUND ART

For pneumatic tires used for driving on unpaved roads such as uneven ground, muddy ground, snowy roads, sandy ground, and rocky areas, a tread pattern is generally employed that is based on lug grooves or blocks including many edge components and that has a large groove area. For such a tire, traveling performance on unpaved roads is improved by biting into mud, snow, sand, stone, rock, or the like on a road surface (hereinafter, referred to collectively as "mud or the like") to achieve good traction performance, and preventing the grooves from being blocked with mud or the like to improve traveling performance on unpaved roads. In particular, in tires intended to travel in rocky areas, traveling performance (performance over rocks) in the rocky areas is enhanced by providing blocks also in side regions further outward than shoulder regions (ground contact edges) in the tire lateral direction (see, for example, Japan Unexamined Patent Publication No. 2010-047251).

In such a tire, blocks are formed in the shoulder regions and the side regions. However, the groove area increases in these regions. Accordingly, stones, rocks and foreign matters on road surfaces easily enter into the grooves provided in the shoulder regions and the side regions, thereby causing the groove bottom to be easily damaged (poor cut resistance). Additionally, since the groove area on the tread surface is also large, wear resistance tends to decrease. Thus, there is a demand for measures for effectively biting into mud or the like via grooves to improve traveling performance on unpaved roads (in particular, in rocky areas) without impairing cut resistance and wear resistance, to provide these performances in a well-balanced manner.

SUMMARY

The present technology provides a pneumatic tire suitable as a tire used for driving on unpaved roads, the pneumatic tire providing enhanced wear resistance on paved roads and enhanced traveling performance and cut resistance on unpaved roads in a compatible manner.

A pneumatic tire according to an embodiment of the present technology includes:

a tread portion extending in a tire circumferential direction to have an annular shape;

a pair of sidewall portions disposed on both sides of the tread portion; and a pair of bead portions disposed inward of the sidewall portions in the tire radial direction, wherein the tread portion is provided with a plurality of longitudinal grooves extending in a tire circumferential direction, a plurality of lateral grooves extending in a tire width direction, and a plurality of blocks defined by the longitudinal grooves and the lateral grooves, the plurality of blocks include an outer block located on an outermost side in the tire lateral direction, the outer block includes a narrow outer block and a wide outer block having different positions at an outer end in the tire lateral direction on a road contact surface of the tread portion, the narrow outer block and the wide outer block are alternately arranged in the tire circumferential direction, at least three blocks adjacent to each other in the tire lateral direction including the outer blocks and at least two longitudinal grooves located between the blocks constitute a repeating element, the repeating element is repeatedly arranged across the lateral groove in the tire circumferential direction, and the pair of repeating elements on both sides of a tire equator are disposed so as to be point-symmetrically with respect to a point on the tire equator, a side region located outward in the tire lateral direction of a shoulder region of the tread portion is provided with a plurality of side grooves extending in the tire lateral direction, the side grooves being positioned on extension lines of the lateral grooves, and a plurality of side blocks defined by the side grooves, the side blocks each include a large block having a larger projection area and a small block with a smaller projection area, the large block is adjacent to the outer side of the narrow outer block in the tire lateral direction, the small block is adjacent to the outer side of the wide outer block in the tire lateral direction, some of the lateral grooves each have a wide portion having a larger groove width at positions of the outer blocks, the other of the lateral grooves each have a narrow portion having a smaller groove width at positions of the outer blocks, the lateral groove having the wide portion and the lateral groove having the narrow portion are alternately disposed in the tire circumferential direction, a groove width of the side groove connected to the wide portion converges toward the inner side in the tire radial direction, a groove width of the side groove connected to the narrow portion widens toward the inner side in the tire radial direction, and the side blocks each are tapered such that a more inner portion in the tire radial direction has a block width more converging toward the wide portion side.

According to an embodiment of the present technology, the above-described complex block structure of the tread portion and the side portion makes it possible to provide wear resistance on paved roads, and traveling performance and cut resistance on unpaved roads in a compatible manner. Specifically, the narrow outer block and the wide outer block that differ in the position of the outer end of the road contact surface of the tread portion in the tire lateral direction are alternately arranged in the tire circumferential direction. Such block structure that becomes complicated in the tire lateral direction may achieve good traction properties, and improve traveling performance (particularly, performance over rocks) on unpaved roads. Additionally, since the repeating elements described above are repeatedly arranged across the lateral groove in the tire circumferential direction, and the pair of repeating elements disposed on both sides of the tire equator are disposed so as to be point-symmetrically disposed with respect to the point on the tire equator, to achieve good traction properties due to the plurality of blocks and improve traveling performance on unpaved roads, the rigidity balance of the overall tread surface may be improved to suitably maintain wear resistance. On the other hand, by providing the side blocks as described above, the edge components of the side blocks increase to exhibit excellent edge effects, thereby improving traveling performance (particularly, performance over rocks) on unpaved roads. Furthermore, in the above-mentioned configuration, since the repeating element is connected to the side block in the tire lateral direction, the overall rigidity from the tread surface to the side region is well-balanced, maintaining good wear resistance. In addition, since the lateral groove and the side groove are also continuous, discharge performance for mud or the like may be increased, which is advantageous in improving traveling performance on unpaved roads. Additionally, the combination of the outer block (narrow outer block, wide outer block) and side block (large block, small block); and the combination of the wide portion and the narrow portion of the lateral groove and the groove width (converged or widened) of the side grooves may optimize the uneven shape from the shoulder region to the side region, thereby improving traveling performance (particularly, the performance over rocks) and cut resistance on unpaved roads in a well-balanced manner.

According to an embodiment of the present technology, a laterally implanted amount of the outer end in the tire lateral direction on the road contact surface of the tread portion of the narrow outer block, with respect to the outer end in the tire lateral direction on the road contact surface of the tread portion of the wide outer block is preferably 6 mm to 12 mm. As a result, the structure of the outer blocks is optimized, which is advantageous in enhancing traction properties to improve traveling performance (particularly, performance over rocks) on unpaved roads while maintaining wear resistance (particularly uneven wear resistance).

According to an embodiment of the present technology, preferably, each of the repeating elements is present on the corresponding platform raised from the groove bottom of the lateral groove, the platform having a flat top surface and protruding on both sides in the tire circumferential direction with respect to the at least three blocks. By providing the platform in this manner, block rigidity may be increased to improve wear resistance. In addition, unevenness of the groove increases due to the presence of the platform, acquiring the edge effect. Further, such increase in unevenness makes mud and the like difficult to clog inside the groove, thereby improving discharge performance for mud or the like, and traveling performance (for example, performance over mud) on unpaved roads.

According to an embodiment of the present technology, the projection height of the side grooves of the side blocks from the groove bottom is preferably 8 mm to 13 mm. As a result, the shape of the side blocks is favorable, which is advantageous in improving traveling performance (particularly, performance over rocks) on unpaved roads.

According to an embodiment of the present technology, a ratio A/SH of the length A to a tire cross-sectional height SH measured along the tire radial direction of the side block is preferably 0.10 to 0.30. As a result, the shape of the side blocks is favorable, which is advantageous in improving traveling performance (particularly, performance over rocks) on unpaved roads.

According to an embodiment of the present technology, it is preferable to further include a raised bottom portion raised from a groove bottom of the side groove connected to the wide portion to connect the pair of side blocks adjacent to the side groove to each other, and a projection height of the raised bottom portion from the groove bottom of the side groove is 3 mm to 5 mm. By allowing the raised bottom portion to connect the pair of side blocks adjacent to the side groove to each other in this manner, the pair of side blocks and the raised bottom portion becomes a series of protrusion portions to increase the rigidity thereof, which is advantageous in improving performance over rocks while increasing cut resistance.

"Length" described herein is a length in the road contact surface of the tread portion unless otherwise noted. The "road contact surface" of each block is a surface portion of each block that actually contacts a plane on which a tire is placed at application of a regular load, in the state where the tire is assembled to a regular rim with regular internal pressure being filled, and is perpendicularly placed on the plane. Note that, the road contact surface does not include a portion that does not actually contact the plane, for example, a chamfered portion. Additionally, "ground contact edge" refers to both ends in the tire axial direction in this state. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire and Rim Association, Inc.), and refers to a "measuring rim" in the case of ETRTO (European Tire and Rim Technical Organization). "Regular internal pressure" is an air pressure defined by standards for each tire according to a system of standards that includes standards on which tires are based, and refers to a "maximum air pressure" in the case of JATMA, refers to the maximum value in the table of "TIRE ROAD LIMITS AT VARIOUS COLD INFLATION PRESSURES" in the case of TRA, and refers to the "INFLATION PRESSURE" in the case of ETRTO. "Regular internal pressure" is 180 kPa for a tire on a passenger vehicle. "Regular load" is a load defined by standards for each tire according to a system of standards that includes standards on which tires are based, and refers to "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. If the tire is for use with a passenger vehicle, a load corresponding to 88% of the loads described above is used.

DETAILED DESCRIPTION

Configurations of embodiments of the present technology will be described in detail below with reference to the accompanying drawings.

Figure 1:
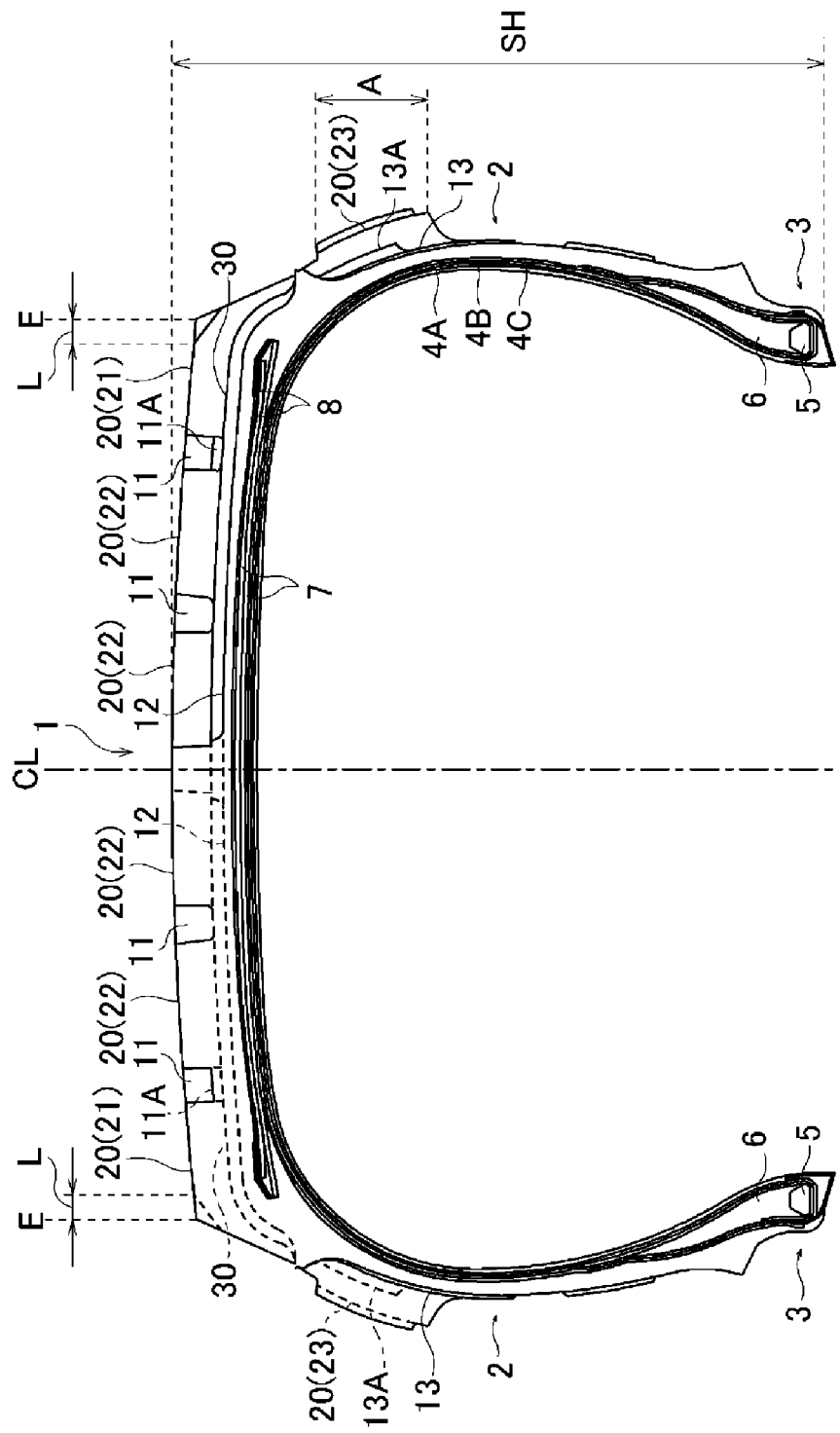
FIG. 1 is a meridian cross-sectional view of a pneumatic tire according to an embodiment of the present technology.

As illustrated in FIG. 1, the pneumatic tire of an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the inner side in the tire radial direction. Note that, in FIG. 1, reference sign "CL" denotes a tire equator, and reference sign "E" denotes a ground contact edge.

In the example illustrated in FIG. 1, three carcass layers 4A, 4B, and 4C are mounted between the pair of left and right bead portions 3. The carcass layers 4A, 4B, and 4C each include a plurality of reinforcing cords extending in the tire radial direction. The carcass layers 4A and 4B are folded back around a bead core 5 disposed in each of the bead portions 3 from the inner side to the outer side of the vehicle. Additionally, bead fillers 6 are disposed on the outer circumference of the bead cores 5, and each bead filler 6 is enveloped with a main body portion and a folded back portion of each of the carcass layers 4A and 4B. The carcass layer 4C is disposed on the outer circumferential side of the carcass layers 4A and 4B along the carcass layers 4A and 4B. On the other hand, in the tread portion 1, a plurality of belt layers 7 (two layers in FIG. 1) are embedded on an outer circumferential side of the carcass layers 4A, 4B, and 4C. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a general pneumatic tire, however, the cross-sectional structure thereof is not limited to the basic structure described above.

Figure 2:
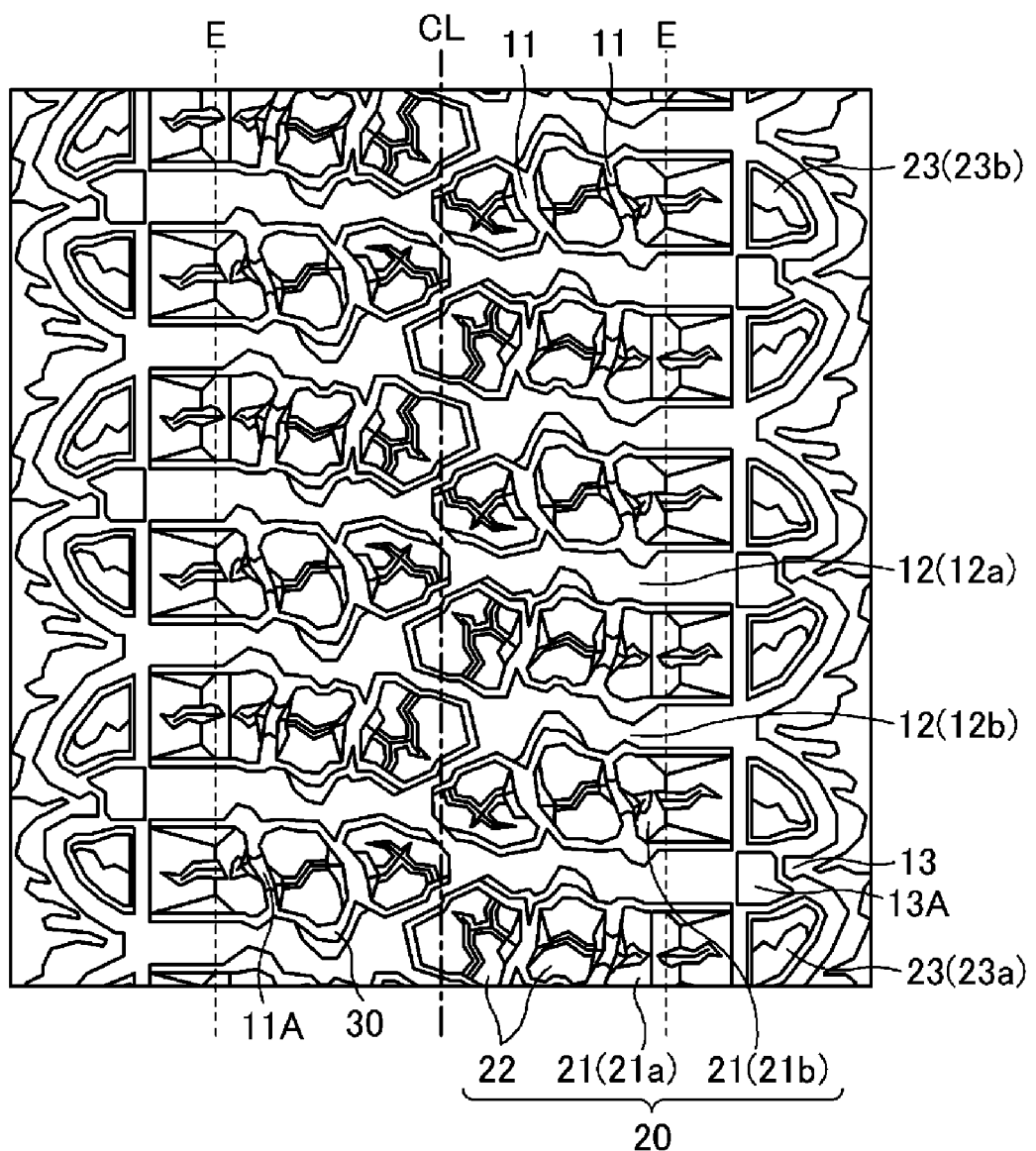
FIG. 2 is a front view illustrating a tread surface of a pneumatic tire according to an embodiment of the present technology.
Figure 3:
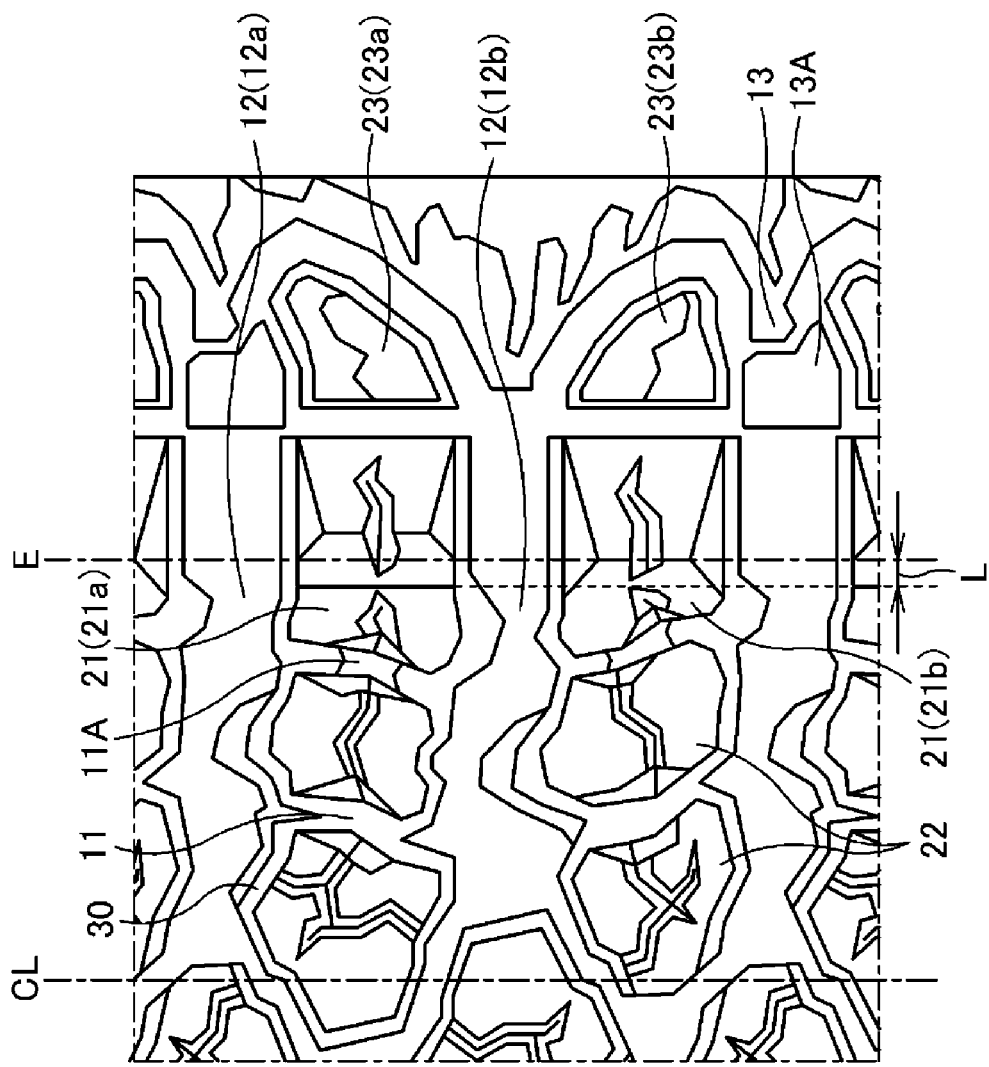
FIG. 3 is an enlarged view illustrating an outer block, an inner block, and a side block according to an embodiment of the present technology on a larger scale.

As illustrated in FIG. 2 and FIG. 3, a plurality of longitudinal grooves 11 extending in the tire circumferential direction, a plurality of lateral grooves 12 extending in the tire lateral direction, and a plurality of blocks 20 defined by the longitudinal grooves 11 and the lateral grooves 12 are formed on an outer surface of the tread portion 1 of the pneumatic tire according to an embodiment of the present technology. In particular, according to an embodiment of the present technology, a plurality of blocks 20 (hereinafter referred to as inner blocks 22) are arranged inward in the tire lateral direction of the block 20 located most outward in the tire lateral direction among the plurality of blocks 20 (hereinafter referred to as an outer block 21), so as to be aligned along the tire lateral direction with respect to the outer block 21. A group of blocks (repeating element) is formed of the outer blocks 21 and the plurality of inner blocks 22 (that is, at least three blocks 20 including the outer block 21, which are adjacent to each other in the tire lateral direction). The groups of blocks are repeatedly arranged across the lateral groove 12 in the tire circumferential direction. In the illustrated example, a block group (repeating element) is constituted of three blocks 20 including the outer block 21 and the two inner blocks 22. As described above, the repeating elements are repeatedly arranged across the lateral groove 12 in the tire circumferential direction, and the pair of repeating elements on both sides of the tire equator CL are disposed to be point-symmetrical with respect to the point on the tire equator CL.

In the example illustrated in FIG. 2 and FIG. 3, each block group (the outer block 21 and two inner blocks 22) is present on a platform 30 described below, which is raised from the groove bottom of the lateral groove 12 and has a flat top surface. At this time, the longitudinal groove 11 located between the blocks 20 constituting each block group is also present on the platform 30. In other words, at least three blocks 20 that include an outer block 21 and are adjacent to each other in the tire lateral direction, and at least two longitudinal grooves 11 located between the adjacent blocks 20 are present on the platform 30. That the longitudinal groove 11 is present on the platform 30 means that the groove bottom of the longitudinal groove 11 coincides with the top surface of the platform 30 or is located closer to the side of the road contact surface of the block than the top surface of the platform 30. This structure is advantageous for increasing block rigidity to improve wear resistance. In addition, unevenness of the groove increases due to the presence of the platform 30, acquiring the edge effect. Further, such increase in unevenness makes mud and the like difficult to clog inside the groove, thereby improving discharge performance for mud or the like, and traveling performance (for example, performance over mud) on unpaved roads.

Figure 4:
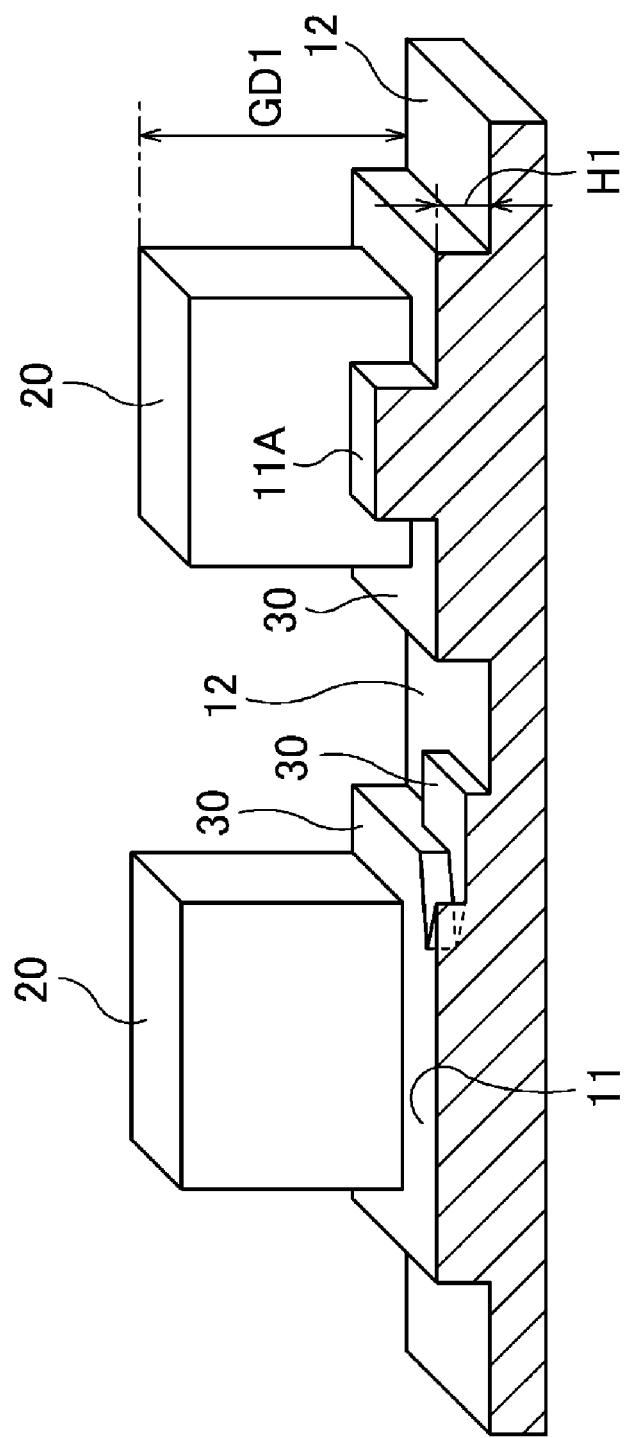
FIG. 4 is an explanatory diagram illustrating a platform according to an embodiment of the present technology.

Note that, as described above, the platform 30 includes a flat top surface raised from the groove bottom of the lateral groove 12, and as illustrated in FIG. 4, the platform is a table-shaped element on which the block 20 and the longitudinal groove 11 may be disposed. Note that, since the platform 30 functions as a table on which the block 20 and the longitudinal groove 11 are mounted, a raised height H1 from the groove bottom is limited to be within, for example, 30% of a maximum groove depth GD1 of the lateral groove 12. Each platform 30 extends on both sides in the tire circumferential direction with respect to at least three blocks 20 constituting each platform 30 when viewed from the road contact surface of the block. In particular, in the illustrated example, a contour line of each platform 30 is bent along contour lines of at least three blocks 20 constituting each platform 30.

In the example illustrated in FIG. 2 and FIG. 3, in addition to the structure described above, a raised bottom portion 11A raised from the groove bottom of the longitudinal groove 11 is provided in the groove bottom of the longitudinal groove 11 adjacent to the outer block 21. The raised bottom portion 11A connects the outer block 21 to the inner block 22 adjacent to the outer block 21. This structure is suitable for increasing the rigidity of the connected outer block 21 and inner block 22 to enhance wear resistance (uneven wear resistance).

According to an embodiment of the present technology, the outer block 21 includes a narrow outer block 21a and a wide outer block 21b that differ in the position of the outer end of the road contact surface of the tread portion in the tire lateral direction. These narrow outer block 21a and wide outer block 21b are alternately arranged in the tire circumferential direction. In the illustrated example, the outer end in the tire lateral direction of the wide outer block 21b coincides with a ground contact edge E, and the outer end of the narrow outer block 21a in the tire lateral direction recedes from the ground contact edge E into the tire equator CL side.

Figure 5:
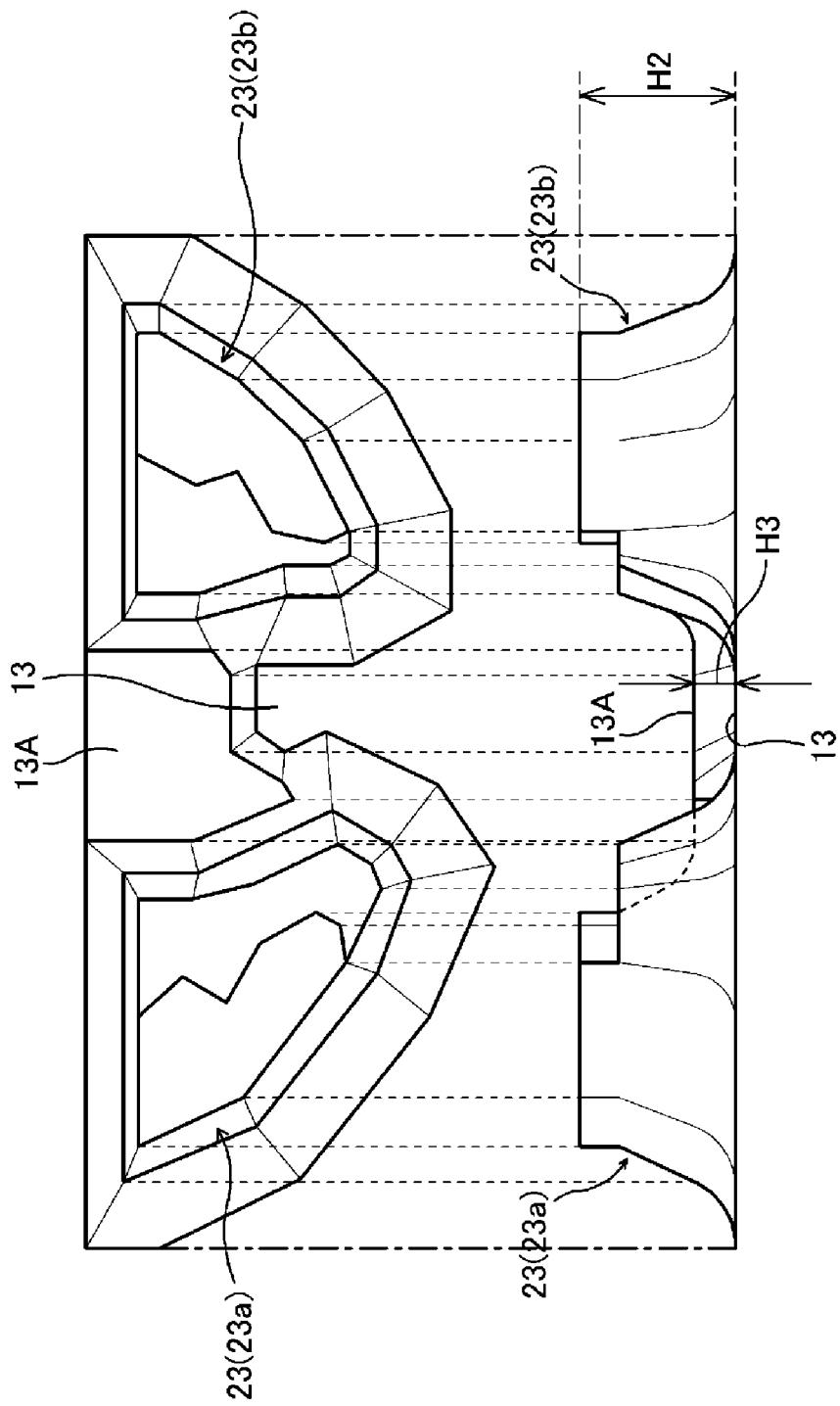
FIG. 5 is an explanatory diagram illustrating a combination of a front view (viewed from a tire side surface) and a side view (viewed from the inner side in the tire radial direction) of the side block according to an embodiment of the present technology.

As illustrated in FIG. 5, a plurality of side blocks 23 is formed in the side regions of the pneumatic tire according to an embodiment of the present technology. As illustrated in the drawings, the side blocks 23 are paired so as to face each other across a side groove 13 extending in the tire lateral direction, and the pair of side block 23 and the side groove 13 constitute a repeating element. The repeating elements are arranged at intervals in the tire circumferential direction. The edge effects may be obtained by providing the side blocks 23 and the side grooves 13, thereby improving traveling performance (particularly, performance over rocks) on unpaved roads.

As illustrated in FIG. 3, the side groove 13 is positioned on an extension line of the lateral groove 12, and the lateral groove 12 and the side groove 13 substantially form a series of grooves, which is excellent in discharge performance for mud or the like. The side block 23 includes a large block 23a having a larger projection area and a small block 23b having a smaller projection area. The large block 23a is adjacent to the outer side of the narrow outer block 21a in the tire lateral direction, and the small block 23b is adjacent to the outer side of the wide outer block 21b in the tire lateral direction.

In addition, the lateral groove 12 has a wide portion 12a having a larger groove width and a narrow portion 12b having a smaller groove width at the position of the outer block 21, and the wide portions 12a and the narrow portions 12b are alternately disposed in the tire circumferential direction. Additionally, the side groove 13 connected to the wide portion 12a converges toward the inner side in the tire radial direction, and the side groove 13 connected to the narrow portion 12b widens toward the inner side in the tire radial direction. As a result, the side block 23 has a tapered shape (substantially triangular shape) in which the more inner side in the tire radial direction has the block width more converging toward the side of the wide portion 12a (the side groove 13 connected to the wide portion 12a).

In the example illustrated in the drawings, the road contact surface of each side block 23 is not flat, but has an uneven shape formed of a reference surface located on the side groove 13 side, and a stepped portion that is located on the opposite side of the side groove 13 and raised from the reference surface. This structure is advantageous for improving traveling performance (particularly, performance over rocks) on unpaved roads because the uneven shape of the side blocks 23 may be complicated to achieve excellent edge effects.

In the example illustrated in the drawings, a raised bottom portion 13A is raised from the groove bottom of the side groove 13 connected to the wide portion 12a to connect the pair of side blocks 23 to each other. In a particularly illustrated example, the raised bottom portion 13A is formed from the outermost side of the side groove 13 in the tire radial direction to the middle portion of the side groove 13. This structure is advantageous for protecting the groove bottom of the side grooves 13 and increasing the rigidity of the connected side blocks 23, thereby improving cut resistance and traveling performance (particularly, performance over rocks) on unpaved roads.

As described above, since a complex block structure is formed in the tread portion and the side region, wear resistance on the paved roads and traveling performance on unpaved roads and cut resistance may be achieved in a compatible manner. Specifically, the narrow outer blocks 21a and the wide outer blocks 21b are alternately arranged in the tire circumferential direction. The block structure that becomes complicated in the tire lateral direction may achieve good traction property, and improve traveling performance (particularly, performance over rocks) on unpaved roads. In addition, since the block groups (the outer blocks 21 and the inner blocks 22) are repeatedly arranged and disposed so as to be point-symmetrical with respect to a point on the tire equator CL. In achieving good traction properties due to the plurality of blocks 20, this may improve traveling performance on unpaved roads, the rigidity balance of the overall tread surface, and suitably maintain wear resistance. On the other hand, the edge effect caused by the side blocks 23 may be ensured and improve traveling performance (particularly, performance over rocks) on unpaved roads. Furthermore, as described above, the block group (the outer block 21 and the inner block 22) and the side block 23 are disposed so as to extend in the tire lateral direction, and thus the overall rigidity balance ranging from tread surface to the side region becomes favorable, favorably maintaining wear resistance. At the same time, since the lateral groove 12 and the side groove 13 are also continuous, discharge performance for mud or the like may be increased, which is advantageous in improving traveling performance on unpaved roads. Additionally, the combination of the outer block 21 (narrow outer block 21a, wide outer block 21b) and side block 23 (large block 23a, small block 23b); and the combination of the wide portion 12a and the narrow portion 12b of the lateral groove 12 and the groove width (converged or widened) of the side grooves 13 may optimize the uneven shape from the shoulder region to the side region, thereby improving traveling performance (particularly, the performance over rocks) and cut resistance on unpaved roads in a well-balanced manner.

A laterally implanted amount L in the outer end in the tire lateral direction on the road contact surface of the tread portion of the narrow outer block 21a, with respect to the outer end in the tire lateral direction on the road contact surface of the tread portion of the wide outer block 21b is preferably 6 mm to 12 mm. As a result, the structure of the outer block 21 is optimized, which is advantageous in improving traction properties and improving traveling performance (particularly, performance over rocks) on unpaved roads while maintaining wear resistance (particularly uneven wear resistance). When the implanted amount L is less than 6 mm, there is substantially no change in the position of the outer end in the tire lateral direction, failing to achieve the effect of improving traction properties. If the implanted amount L is greater than 12 mm, there is a risk that wear resistance (particularly uneven wear resistance) may be affected. The large block 23a and the small block 23b may have the relative size relationships described above, but the projection area of the small block 23b is preferably 80% to 90% of the projection area of the large block 23a. Similarly, the wide portion 12a and the narrow portion 12b may have the relative size relationship described above, but the width of the narrow portion 12b is preferably 90% to 97% of the groove width of the wide width portion 12a.

A projection height H2 of the side block 23 from the groove bottom of the side groove 13 is preferably from 8 mm to 13 mm. As a result, the shape of the side blocks 23 becomes favorable, which is advantageous in improving traveling performance (particularly, performance over rocks) on unpaved roads. Note that, the projection height H2 is a maximum projection height, for example, a height of a most protruding portion in the case where the road contact surface of the side block 23 is uneven as illustrated, for example. When the projection height H2 is less than 8 mm, the side block 23 is too small, making it difficult to obtain the effect of providing the side blocks 23. When the projection height H2 is greater than 13 mm, the amount of rubber (weight) of the sidewall portion 2 increases to lower traction properties, and road ability on unpaved roads (in particular, on rocky areas) may be affected.

A ratio A/SH of a length A to the tire cross-sectional height SH when measured along the tire radial direction of the side blocks 23 is preferably 0.10 to 0.30. As a result, the shape of the side blocks 23 becomes favorable, which is advantageous in improving traveling performance (particularly, performance over rocks) on unpaved roads. When the ratio A/SH is less than 0.10, the length of the side block 23 in the tire radial direction becomes shorter, and the side block 23 itself becomes smaller. Thus, the effect of the side block 23 is limited. When the ratio A/SH is greater than 0.30, the amount of rubber (weight) of the sidewall portion 2 increases to lower traction properties, and road ability on unpaved roads (in particular, on rocky areas) may be affected.

As illustrated, when the raised bottom portion 13A is raised from the groove bottom of the side groove 13 connected to the wide portion 12a to connect the pair of side blocks 23 to each other, a projection height H3 of the raised bottom portion from the groove bottom of the side groove 13 is preferably 3 mm to 5 mm. By allowing the raised bottom portion 13A to connect the pair of side blocks 23 adjacent to the side groove 13 to each other in this manner, the pair of side blocks 23 and the raised bottom portion 13A becomes a series of protrusion portions to increase the rigidity thereof, which is advantageous in improving performance over rocks while increasing cut resistance. When the projection height H3 is less than 3 mm, no substantially raised portion is formed from the groove bottom of the side groove 13, failing to connect the side blocks 23 to each other, thereby sufficiently increasing the rigidity. If the projection height H3 is greater than 5 mm, the groove volume of the side groove 13 decreases, which may affect discharge performance for mud or the like.

A raised height H1 of the platform 30 is preferably not greater than 30% of a maximum groove depth GD1 of the lateral groove 12, as previously described, and more preferably 5% to 25% of the maximum groove depth GD1 of the lateral groove 12. Setting the height H1 of the platform 30 to the appropriate range as described above ensures a sufficient groove area of the lateral grooves 12 to achieve good performance over mud and further, the block rigidity of the platform 30 may be ensured to improve wear resistance. As a result, these performances may be achieved in a well-balanced manner. At this time, when the raised height H1 of the platform 30 is less than 5% of the maximum groove depth GD1 of the lateral groove 12, the effect of increasing block rigidity is limited, making it difficult to sufficiently ensure wear resistance. When the raised height H1 of the platform 30 is greater than 25% of the maximum groove depth GD1 of the lateral groove 12, the groove area of the lateral grooves 12 may decrease, which may affect the performance over mud.

Since the platform 30 extends on both sides in the tire circumferential direction with respect to at least three blocks 20 constituting each platform 30 as described above, the platform 30 is wider than the road contact surface of at least three blocks 20 constituting each platform 30. In particular, the ratio of the total area of the road contact surfaces of the blocks 20 present on the platform 30 to the projected area of the platform 30 is preferably 55% to 75%. As a result, the balance between the platform 30 and the block 20 becomes favorable, which is advantageous in achieving both of performance over mud and wear resistance in a well-balanced manner. When the ratio of the area is smaller than 55%, the effect of increasing the block rigidity is limited, making it difficult to sufficiently ensure wear resistance. When the ratio of the area is greater than 75%, the groove area of the lateral groove 12 decreases, which may affect performance over mud. Note that, the projected area of the platform 30 refers to the area inside the contour line of the platform 15 when viewed from the road contact surface side of the block (the total area including the portion where the block 13 is present).

EXAMPLE 21 types of pneumatic tires in Comparative Examples 1 to 4 and Examples 1 to 16 with a tire size of 35×12.50 R17, having the basic structure illustrated in FIG. 1, based on the tread pattern illustrated in FIG. 2 were produced in following conditions set as illustrated in Tables 1 and 2: presence or absence of wide outer block, presence or absence of narrow outer block, implanted amount L, large block arrangement, small block arrangement, presence or absence of narrow portion of lateral groove, presence or absence of wide portion of lateral groove, change in groove width of side groove connected to narrow portion, change in width of side groove connected to wide portion, presence or absence of platform, projection height H2 of side block, ratio A/SH of length A to tire cross-sectional height SH measured along tire radial direction of side block, and projection height H3 of raised bottom portion of the side grooves.

In Table 1, the "Large Block Arrangement" and "Small Block Arrangement" indicates whether the large block or small block is disposed so as to be adjacent to either the narrow outer block or the wide outer block, "Narrow" indicates the case where the large block or small block is disposed adjacent to the narrow outer block, and "Wide" indicates the case where the large block or small block is disposed adjacent to the wide outer block. In Table 1, "Change in Width of Side Groove Connected to Narrow Portion" and "Change in Width of Side Groove Connected to Wide Portion" indicates whether the width of the side groove converges toward the inner side in the tire radial direction, or widens toward the inner side in the tire radial direction, "Converged" indicates the case where the width converges toward the inner side in the tire radial direction, and "Widened" indicates the case where the width widens toward the inner side in the tire radial direction.

In Comparative Example 1, "Presence or Absence of Wide Outer Block" is "Present", and the "presence or absence of narrow outer block" is "No", which means that the outer ends in the width direction of all outer blocks match the ground contact edge, and only wide outer blocks are present (no narrow outer block is present). Additionally, in Comparative Example 1, both of "Presence or Absence of Narrow Portion" and "Presence or Absence of Wide Portion" are "Absent", which means that the lateral groove has a constant width and there is no change in the groove width (neither narrow nor wide portion is present).

For wear resistance, performance over mud, performance over rocks, and cut resistance, these pneumatic tires were evaluated by a following evaluation method, and the results are also illustrated in Tables 1 and 2.

Wear Resistance

The test tires each were assembled to respective wheels with a rim size of 17×10.0 J, inflated to an air pressure of 240 kPa, and mounted on a test vehicle (four wheel drive). After driving on a paved road for 30,000 km, the wear amount of was measured. Evaluation results were expressed as index values with the reciprocal of measurements in Conventional Example 1 being assigned the index value of 100. Larger index values indicate smaller wear amount and superior wear resistance.

Performance Over Mud

The test tires each were assembled to respective wheels having a rim size of 17×10.0 J, inflated to an air pressure of 240 kPa, and mounted on a test vehicle (four wheel drive). For accelerating performance and escaping performance, sensory evaluation by a test driver was performed on a muddy road surface. Evaluation results are expressed as index values with Conventional Example 1 being assigned the index value of 100. Larger index values indicate superior performance over mud.

Performance Over Rocks

The test tires each were assembled to respective wheels having a rim size of 17×10.0 J, inflated to an air pressure of 240 kPa, and mounted on a test vehicle (four wheel drive). For traction properties and starting performance, sensory evaluation by a test driver was performed on a rocky road surface. Evaluation results are expressed as index values with Conventional Example 1 being assigned the index value of 100. Larger index value indicates superior performance over rocks.

Cut Resistance

After evaluation of performance over rocks described above, the cut edge length of a damage generated in the side region and the shoulder region was measured. Evaluation results were expressed as index values with the reciprocal of values in Conventional Example 1 being assigned the index value of 100. Larger index values indicate shorter cut edge length and superior cut resistance.

TABLE 1

|  |  | Comparative Example 1 | Comparative Example 2 | Comparative Example 3 |
|---|---|---|---|---|
| Presence/Absence of Wide Outer Block |  | Present | Present | Present |
| Presence/Absence of Narrow Outer Block |  | Absent | Present | Present |
| Implanted Amount L | mm | — | 7 | 7 |
| Large Block Arrangement |  | Wide | Wide | Narrow |
| Small Block Arrangement |  | Wide | Narrow | Wide |
| Presence/Absence of Narrow Portion |  | Absent | Present | Present |
| Presence/Absence of Wide Portion |  | Absent | Present | Present |
| Change in Groove Width of Side Groove Connected to Narrow Portion |  | — | Widened | Converged |
| Change in Width of Side Groove Connected to Wide Portion |  | — | Converged | Widened |
| Presence/Absence of Platform |  | Absent | Present | Present |
| Projection Height H2 | mm | 12 | 12 | 12 |
| Ratio A/SH |  | 0.2 | 0.2 | 0.2 |
| Projection Height H3 | mm | 4 | 4 | 4 |
| Wear Resistance | Index Value | 100 | 97 | 98 |
| Performance over mud | Index Value | 100 | 98 | 101 |
| Performance over rocks | Index Value | 100 | 98 | 101 |
| Cut Resistance | Index Value | 100 | 99 | 97 |

|  |  | Example 1 | Comparative Example 4 | Example 2 |
|---|---|---|---|---|
| Presence/Absence of Wide Outer Block |  | Present | Present | Present |
| Presence/Absence of Narrow Outer Block |  | Present | Present | Present |
| Implanted Amount L | mm | 7 | 4 | 6 |
| Large Block Arrangement |  | Narrow | Narrow | Narrow |

TABLE 1-continued

| Small Block Arrangement |  | Wide | Wide | Wide |
|---|---|---|---|---|
| Presence/Absence of Narrow Portion |  | Present | Present | Present |
| Presence/Absence of Wide Portion |  | Present | Present | Present |
| Change in Groove Width of Side Groove Connected to Narrow Portion |  | Widened | Widened | Widened |
| Change in Width of Side Groove Connected to Wide Portion |  | Converged | Converged | Converged |
| Presence/Absence of Platform |  | Present | Present | Present |
| Projection Height H2 | mm | 12 | 12 | 12 |
| Ratio A/SH |  | 0.2 | 0.2 | 0.2 |
| Projection Height H3 | mm | 4 | 4 | 4 |
| Wear Resistance | Index Value | 102 | 102 | 102 |
| Performance over mud | Index Value | 105 | 100 | 102 |
| Performance over rocks | Index Value | 105 | 100 | 102 |
| Cut Resistance | Index Value | 102 | 102 | 102 |

|  |  | Example 3 | Comparative Example 5 | Example 4 |
|---|---|---|---|---|
| Presence/Absence of Wide Outer Block |  | Present | Present | Present |
| Presence/Absence of Narrow Outer Block |  | Present | Present | Present |
| Implanted Amount L | mm | 12 | 14 | 7 |
| Large Block Arrangement |  | Narrow | Narrow | Narrow |
| Small Block Arrangement |  | Wide | Wide | Wide |
| Presence/Absence of Narrow Portion |  | Present | Present | Present |
| Presence/Absence of Wide Portion |  | Present | Present | Present |
| Change in Groove Width of Side Groove Connected to Narrow Portion |  | Widened | Widened | Widened |
| Change in Width of Side Groove Connected to Wide Portion |  | Converged | Converged | Converged |
| Presence/Absence of Platform |  | Present | Present | Absent |
| Projection Height H2 | mm | 12 | 12 | 12 |
| Ratio A/SH |  | 0.2 | 0.2 | 0.2 |
| Projection Height H3 | mm | 4 | 4 | 4 |
| Wear Resistance | Index Value | 101 | 99 | 101 |
| Performance over mud | Index Value | 105 | 105 | 103 |
| Performance over rocks | Index Value | 105 | 105 | 105 |
| Cut Resistance | Index Value | 101 | 100 | 102 |

TABLE 2

|  | Example 5 | Example 6 | Example 7 | Example 8 |
|---|---|---|---|---|
| Presence/Absence of Wide Outer block | Present | Present | Present | Present |
| Presence/Absence of Narrow Outer Block | Present | Present | Present | Present |

TABLE 2-continued

|  |  |  |  |  |  |
|---|---|---|---|---|---|
| Implanted Amount L | mm | 7 | 7 | 7 | 7 |
| Arrangement of Large Block |  | Narrow | Narrow | Narrow | Narrow |
| Arrangement of Small Block |  | Wide | Wide | Wide | Wide |
| Presence/Absence of Narrow Portion |  | Present | Present | Present | Present |
| Presence/Absence of Wide Portion |  | Present | Present | Present | Present |
| Change in Groove Width of Side Groove Connected to Narrow Portion |  | Widened | Widened | Widened | Widened |
| Change in Width of Side Groove Connected to Wide Portion |  | Converged | Converged | Converged | Converged |
| Presence/Absence of Platform |  | Present | Present | Present | Present |
| Projection Height H2 | mm | 5 | 8 | 13 | 15 |
| Ratio A/SH |  | 0.2 | 0.2 | 0.2 | 0.2 |
| Projection Height H3 | mm | 4 | 4 | 4 | 4 |
| Wear Resistance | Index Value | 102 | 102 | 101 | 100 |
| Performance over mud | Index Value | 102 | 104 | 105 | 105 |
| Performance over rocks | Index Value | 102 | 104 | 105 | 105 |
| Cut Resistance | Index Value | 101 | 102 | 102 | 102 |

|  |  | Example 9 | Example 10 | Example 11 | Example 12 |
|---|---|---|---|---|---|
| Presence/Absence of Wide Outer block |  | Present | Present | Present | Present |
| Presence/Absence of Narrow Outer Block |  | Present | Present | Present | Present |
| Implanted Amount L | mm | 7 | 7 | 7 | 7 |
| Arrangement of Large Block |  | Narrow | Narrow | Narrow | Narrow |
| Arrangement of Small Block |  | Wide | Wide | Wide | Wide |
| Presence/Absence of Narrow Portion |  | Present | Present | Present | Present |
| Presence/Absence of Wide Portion |  | Present | Present | Present | Present |
| Change in Groove Width of Side Groove Connected to Narrow Portion |  | Widened | Widened | Widened | Widened |
| Change in Width of Side Groove Connected to Wide Portion |  | Converged | Converged | Converged | Converged |
| Presence/Absence of Platform |  | Present | Present | Present | Present |
| Projection Height H2 | mm | 12 | 12 | 12 | 12 |
| Ratio A/SH |  | 0.09 | 0.10 | 0.30 | 0.35 |
| Projection Height H3 | mm | 4 | 4 | 4 | 4 |
| Wear Resistance | Index Value | 102 | 102 | 101 | 100 |
| Performance over mud | Index Value | 102 | 104 | 105 | 105 |
| Performance over rocks | Index Value | 102 | 104 | 105 | 105 |
| Cut Resistance | Index Value | 101 | 102 | 102 | 102 |

|  |  | Example 13 | Example 14 | Example 15 | Example 16 |
|---|---|---|---|---|---|
| Presence/Absence of Wide Outer block |  | Present | Present | Present | Present |
| Presence/Absence of Narrow Outer Block |  | Present | Present | Present | Present |
| Implanted Amount L | mm | 7 | 7 | 7 | 7 |
| Arrangement of Large Block |  | Narrow | Narrow | Narrow | Narrow |
| Arrangement of Small Block |  | Wide | Wide | Wide | Wide |
| Presence/Absence of Narrow Portion |  | Present | Present | Present | Present |
| Presence/Absence of Wide Portion |  | Present | Present | Present | Present |
| Change in Groove Width of Side Groove Connected to Narrow Portion |  | Widened | Widened | Widened | Widened |
| Change in Width of Side Groove Connected to Wide Portion |  | Converged | Converged | Converged | Converged |
| Presence/Absence of Platform |  | Present | Present | Present | Present |
| Projection Height H2 | mm | 12 | 12 | 12 | 12 |
| Ratio A/SH |  | 0.2 | 0.2 | 0.2 | 0.2 |
| Projection Height H3 | mm | 2 | 3 | 5 | 6 |
| Wear Resistance | Index Value | 102 | 102 | 103 | 103 |
| Performance over mud | Index Value | 105 | 105 | 103 | 102 |
| Performance over rocks | Index Value | 105 | 105 | 103 | 102 |
| Cut Resistance | Index Value | 101 | 102 | 103 | 104 |

As is clear from Tables 1 and 2, as compared to Comparative Example 1, Examples 1 to 16 provided improved wear resistance, performance over mud, performance over rocks, and cut resistance and achieved these performances in a well-balanced manner to a high degree. Although only the performance over mud on the muddy road surface and performance over rocks on the rocky road surface were evaluated, even when driving on other unpaved roads (snowy road, sandy ground, and the like), the tires of an embodiment of the present technology exhibited the same function as on mud on the muddy road surface and rocks on the rocky road surface against snow, sand, stones, and the like on the road surface, and thus exhibited excellent traveling performance on unpaved roads.

On the contrary, in Comparative Example 2, the wide outer block and the large block were adjacent to each other, the narrow outer block and the small block were adjacent to each other, and the arrangement of these blocks was reversed. As a result, performance over mud and performance over rocks cannot be improved, and wear resistance and cut resistance were also negatively affected. In Comparative Example 3, the groove width of the side groove connected to the narrow portion of the lateral groove converged toward the inner side in the tire radial direction, the groove width of the side groove connected to the wide portion of the lateral groove widened toward the inner side in the tire radial direction, and the change in groove width of the side groove was reversed. As a result, wear resistance and cut resistance were negatively affected. In Comparative Example 4, the implanted amount L was too small and thus, the effect of improving performance over mud and performance over rocks was not acquired. In Comparative Example 5, the implanted amount L was too large and thus, wear resistance was negatively affected.

The invention claimed is:

1. A pneumatic tire comprising:
a tread portion extending in a tire circumferential direction to have an annular shape;
a pair of sidewall portions disposed on both sides of the tread portion; and
a pair of bead portions disposed inward of the sidewall portions in the tire radial direction, wherein
the tread portion is provided with a plurality of longitudinal grooves extending in a tire circumferential direction, a plurality of lateral grooves extending in a tire width direction, and a plurality of blocks defined by the longitudinal grooves and the lateral grooves,
the plurality of blocks include outer blocks located on an outermost side in the tire lateral direction,
the outer blocks include narrow outer blocks and wide outer blocks having different positions at an outer end in the tire lateral direction on a road contact surface of the tread portion, the narrow outer blocks and the wide outer blocks are alternately arranged in the tire circumferential direction, at least three blocks adjacent to each other in the tire lateral direction including the outer blocks and at least two longitudinal grooves located between the at least three blocks constitute a repeating element, the repeating element is repeatedly arranged across the lateral grooves in the tire circumferential direction, and a pair of repeating elements on both sides of a tire equator is disposed so as to be point-symmetrically with respect to a point on the tire equator,
a side region located outward in the tire lateral direction of a shoulder region of the tread portion is provided with a plurality of side grooves extending in the tire lateral direction, the side grooves being positioned on extension lines of the lateral grooves, and a plurality of side blocks defined by the side grooves,
the side blocks include a large block having a larger projection area and a small block with a smaller projection area, the large block is adjacent to the outer side of the narrow outer block in the tire lateral direction, the small block is adjacent to the outer side of the wide outer block in the tire lateral direction,
some of the lateral grooves each have a wide portion having a larger groove width at positions of the outer blocks, the other of the lateral grooves each have a narrow portion having a smaller groove width than the larger groove width at positions of the outer blocks,
the lateral grooves having the wide portion and the lateral grooves having the narrow portion are alternately disposed in the tire circumferential direction,
a groove width of the side grooves connected to the wide portions converges toward the inner side in the tire radial direction,
a groove width of the side grooves connected to the narrow portions widens toward the inner side in the tire radial direction, and
the side blocks each are tapered such that a more inner portion in the tire radial direction has a block width more narrowing in the tire circumferential direction toward the wide portion rather than toward the narrow portion.

2. The pneumatic tire according to claim 1, wherein an implanted amount of the outer end in the tire lateral direction on the road contact surface of the tread portion of the narrow outer blocks, with respect to the outer end in the tire lateral direction on the road contact surface of the tread portion of the wide outer blocks is 6 mm to 12 mm.

3. The pneumatic tire according to claim 2, wherein the repeating elements each are present on a platform raised from a groove bottom of the lateral grooves, the platform having a flat top surface and extending on both sides in the tire circumferential direction with respect to the at least three blocks.

4. The pneumatic tire according to claim 3, wherein a projection height of the side blocks from the groove bottom of the side grooves is from 8 mm to 13 mm.

5. The pneumatic tire according to claim 4, wherein a ratio A/SH of a length A to a tire cross-sectional height SH when measured along the tire radial direction of the side blocks is 0.10 to 0.30.

6. The pneumatic tire according to claim 5, further comprising a raised bottom portion raised from the groove bottom of the side grooves connected to the wide portion to connect the pair of side blocks adjacent to the side grooves to each other, wherein a projection height of the raised bottom portion from the groove bottom of the side grooves is 3 mm to 5 mm.

7. The pneumatic tire according to claim 1, wherein the repeating elements each are present on a platform raised from a groove bottom of the lateral grooves, the platform having a flat top surface and extending on both sides in the tire circumferential direction with respect to the at least three blocks.

8. The pneumatic tire according to claim 1, wherein a projection height of the side blocks from the groove bottom of the side grooves is from 8 mm to 13 mm.

9. The pneumatic tire according to claim 1, wherein a ratio A/SH of a length A to a tire cross-sectional height SH when measured along the tire radial direction of the side blocks is 0.10 to 0.30.

10. The pneumatic tire according to claim 1, further comprising a raised bottom portion raised from the groove bottom of the side grooves connected to the wide portion to connect the pair of side blocks adjacent to the side grooves to each other, wherein a projection height of the raised bottom portion from the groove bottom of the side grooves is 3 mm to 5 mm.

* * * * *